United States Patent Office 3,521,156
Patented July 21, 1970

3,521,156
APPARATUS FOR TESTING INTERNAL COMBUSTION ENGINE IGNITION SYSTEMS FOR INCIPIENT FAILURES CAUSING MISFIRING
Carl H. Mueller, Pasadena Hills, and Rudy F. Schneller, O'Fallon, Mo., assignors to McNeil Corporation, Akron, Ohio, a corporation of Ohio
Filed Jan. 22, 1968, Ser. No. 699,541
Int. Cl. G01r 13/42
U.S. Cl. 324—15                     7 Claims

ABSTRACT OF THE DISCLOSURE

The apparatus disclosed is useful for testing internal combustion engine ignition systems of the type having spark plugs, an inductive ignition coil and a circuit for charging the coil, the charging circuit including so-called ignition ponts for controlling the flow of current through the coil to discharge energy from the coil into the spark plugs. A pair of test leads are provided one of which is connected to the ignition system between the coil and the points and the other of which is connected to ground. A capacitor is connected across the test leads to divert a portion of the available energy and thereby reduce the peak voltage provided by the coil so that conditions corresponding to an incipient failure in the ignition system will cause the system to misfire during testing. A low pass filter connected to the test leads passes A.C. signals at those frequencies which are characteristic of the discharge of the coil without firing of a spark plug while blocking A.C. signals at those frequencies which are characteristic of the discharge of the coil when the spark plug fires. A.C. signals passed by the filter are rectified and applied to a meter to provide an indication that misfiring has occurred.

BACKGROUND OF THE INVENTION

This invention relates to apparatus for testing internal combustion engine ignition systems and more particularly to such apparatus which will detect incipient failures.

It has been found that the discharge of an ignition coil in a conventional automotive ignition system, i.e., the so-called Kettering ignition system, produces A.C. signals of relatively high frequency and relatively low amplitude if the spark plug fires in normal fashion and produces A.C. signals of relatively low frequency and relatively high amplitude if the spark plug does not fire, e.g., due to burning of the plug which widens the spark gap, resistance in the circuit, or other cause. Heretofore, this knowledge has been utilized principally in the oscillographic analysis of ignition systems where the discharge waveforms may be directly observed.

SUMMARY OF THE INVENTION

Among the several objects of the present invention may be noted the provision of apparatus for directly detecting faults in an ignition system; the provision of such apparatus in which the detection does not require the visual analysis of waveforms; the provision of such apparatus which will detect faults caused by various different component failures; the provision of such apparatus which will detect incipient faults before actual failure in operation occurs; the provision of such apparatus which is reliable and easily operated; and the provision of such apparatus which is simple and relatively inexpensive. Other objects and features will be in part apparent and in part pointed out hereinafter.

Briefly, apparatus according to the present invention is useful for testing an internal combustion engine ignition system of the type having at least one spark plug, an inductive ignition coil and circuit means for charging the coil, the circuit means including timing switch means for controlling the flow of current through the coil to discharge energy from the coil into the spark plug. The testing apparatus includes a pair of test leads one of which is adapted to be connected to the ignition system between the coil and the switch means. The other of the test leads is adapted to be connected to a point of fixed potential such as ground. A low pass filter is connected to the test leads for selectively passing A.C. signals at frequencies which are characteristic of the discharge of the coil without firing of the spark plug and for blocking A.C. signals at frequencies which are characteristic of the discharge of the coil with firing of the spark plug. Signals passed by the filter are rectified and applied to a meter for indicating their amplitude. A capacitor is connected across the test leads for reducing the peak voltage provided by the coil. Accordingly, conditions corresponding to an incipient failure in the ignition system cause the spark plug to misfire during testing and the meter provides a reading indicating the misfire.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
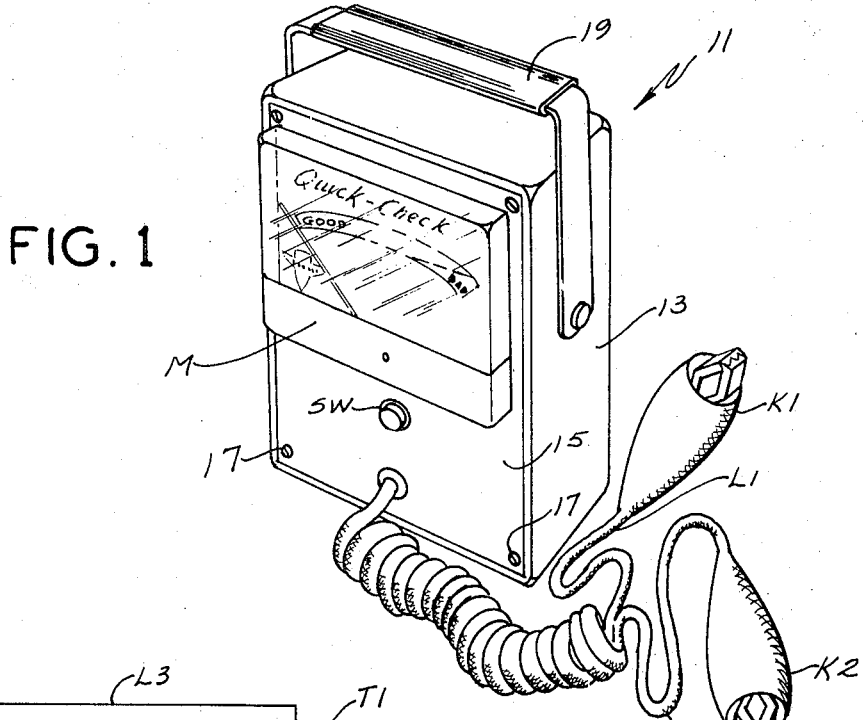
FIG. 1 is a perspective view of ignition system testing apparatus according to this invention mounted in an enclosure facilitating its use.

Referring now to FIG. 1, testing apparatus of the present invention is mounted in a portable enclosure 11. The enclosure consists of an open-faced box 13 constructed of an insulating material such as Bakelite and a removable front panel 15 which is mounted on box 13 by means of screws 17. A handle 19 is provided for conveniently transporting the apparatus. Mounted on the front panel 15 is a meter M which, as is described in greater detail hereinafter, provides an indication of ignition system performance on an arbitrary scale. This scale may, as illustrated, be provided merely with qualitative indications such as "GOOD" and "BAD." A push button switch SW is provided for varying the test of the ignition system, also as explained hereinafter. A pair of test leads L1 and L2 extending from the enclosure are provided with insulated alligator clips K1 and K2 respectively for connecting the apparatus to an ignition system to be tested.

Figure 2:
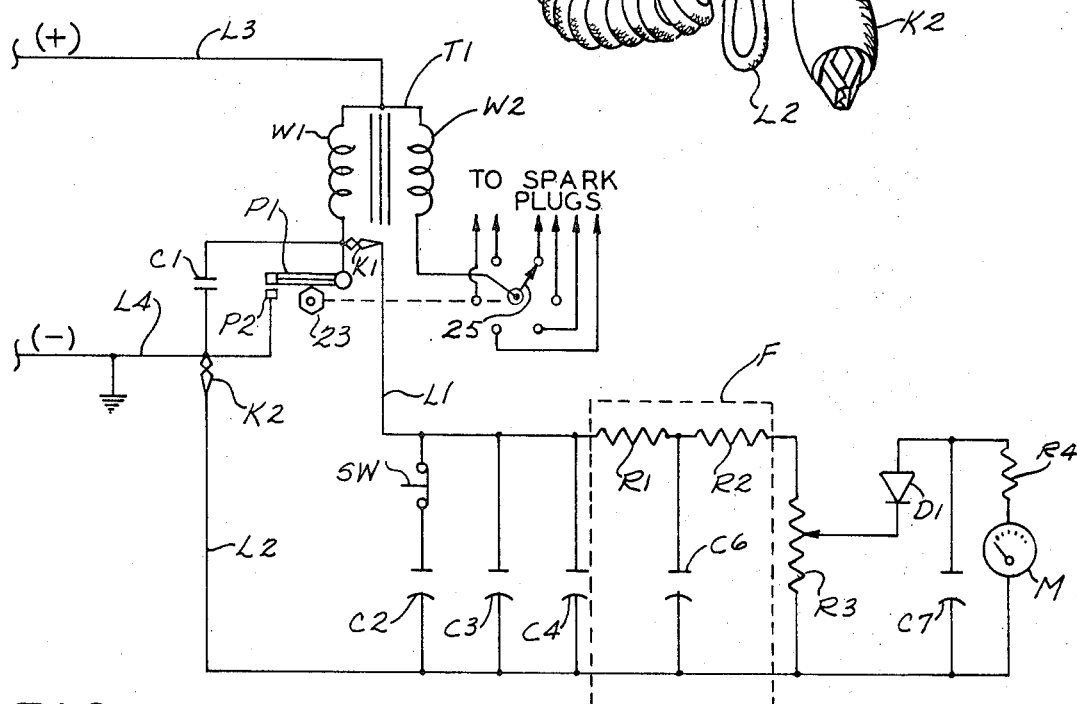
FIG. 2 is a schematic circuit diagram of the testing apparatus connected to a conventional automotive ignition system.

Referring now to FIG. 2, the testing apparatus of the present invention is shown as being connected to a conventional automobile ignition system. The ignition system includes an ignition coil or transformer T1 comprising a low voltage primary winding W1 and a high voltage secondary winding W2. One end of the primary winding W1 is connected to a positive supply lead L3 through which current is supplied from the automobile's electrical system. A second supply lead L4 is connected to the negative side of the automobile's electrical system and is considered to constitute electrical ground in the example illustrated. The other end of winding W1 is connected to lead L4 through a set of so-called ignition points or contacts P1 and P2. The point or contact P2 is stationary and is connected to lead L4 (ground) in conventional manner while the movable point or contact P1 is connected to the primary winding W1 of the coil. The contact P1 is moved into and out of engagement with the fixed contact P2 by a cam 23 which is rotated in synchronism with the operation of the automotive engine in conventional manner. It can thus be seen that a circuit is periodically completed from the supply leads L3 and L4 through the primary winding W1 for charging the ignition coil and that this circuit is periodically broken by the opening of the points P1 and P2 which constitute timing switch means for this purpose. As is understood by those skilled in the art, the opening of the points P1 and P2 breaking the flow of current in the coil's primary winding W1 causes the energy inductively stored in the coil to be discharged in a so-called inductive kick. The inductive discharge causes voltages in the order of magnitude of several hundred volts to be generated in the primary winding W1 and voltages in the order of tens of thousands of volts to be generated in the secondary winding W2. A conventional ignition system condenser C1 is connected across the points P1 and P2 to suppress arcing which otherwise would cause the points to be rapidly eroded and would prevent proper operation of the ignition system.

One end of the secondary winding W2 is connected to the positive supply lead L3 and its other end is connected to a distributor rotor 25 which rotates with the cam 23 in conventional manner. Rotor 25 causes the high voltages which are periodically generated in the secondary winding W2 to be applied to the engine's spark plugs in proper sequence, there being six spark plugs and six lobes on the cam 23 in the example illustrated, corresponding to a six cylinder engine.

Referring now to the testing apparatus itself, the test lead L1 is connected to the ignition system at a point between the primary winding W1 of ignition coil T1 and the points P1 and P2 so as to pick up voltage signals which are generated by the discharging of the coil. The other test lead L2 is connected on the other side of the points P1 and P2 to the lead L4 (ground) which provides a point of fixed potential, leads L1 and L2 thus being connected across the points P1 and P2.

Connected across leads L1 and L2 are three capacitor units C2–C4. These capacitors divert energy from or slow the response of the ignition system during testing, the total value of capacitance added being chosen to reduce the peak voltage which can be provided by the ignition system to a preselected value which is approximately two-thirds of its normal peak value. One of the capacitors (C2) is connected through the switch SW. This switch is constituted by a normally closed push-button switch so that, by pressing the button, the number of capacitors operative and the value of the loading capacitance may be reduced to permit ignition systems having components of different values to be tested. Most conventional ignition systems employ an ignition condenser C1 having a value of about .25 microfarad. To provide the reduction in peak voltage noted above, a value of .5 microfarad for each of the capacitors C2–C4 has been found to be satisfactory. In this case the total additional capacitance is then 1.5 microfarads or about six times the usual value of the ignition system condenser C1 mentioned previously.

The reduction in the available peak voltage produced by the addition of the loading capacitance causes conditions which correspond to an incipient failure, e.g., a partial burning of spark plugs, to result in actual misfiring during testing.

As noted previously, the discharging or firing of ignition coil T1 in a properly operating ignition system, that is, one in which the spark plugs fire normally, generates A.C. signals which are of relatively high frequency, e.g., ten thousand Hz., and are of relatively small amplitude. However, if a misfire occurs, the inductively stored energy is dissipated in an oscillatory manner which generates A.C. signals which are of lower frequency, e.g., about three thousand Hz., and which are of relatively large amplitude.

Connected to the test leads L1 and L2 is a low pass filter F. Filter F comprises a pair of resistors R1 and R2 connected in series with lead L1 and a capacitor C6 which connects a junction between the resistors R1 and R2 to lead L2. The values of resistors R1 and R2 and capacitor C6 are chosen to substantially pass those relatively low frequency A.C. signals which are characteristic of the discharging of ignition coil T1 without the firing of a spark plug and to substantially block those relatively high frequency A.C. signals which are characteristic of the discharge of coil T1 when a spark plug fires. A potentiometer R3 is connected across the output of filter F so as to provide at the movable tap of the potentiometer a preselected portion of the A.C. signals passed by the filter.

The meter M is connected between lead L2 and the movable tap potentiometer R3 through a circuit which includes a diode rectifier D1 and a resistor R4. Diode D1 rectifies the A.C. signals passed by the filter F and the potentiometer R3. The diode is oriented to pass the negative-going portions of the A.C. signals passed by filter F and thus blocks the D.C. voltage component which is provided by the automobile's electrical system when the points are open. Meter M and resistor R4 together are shunted by a storage capacitor C7 which slows the decay of the meter indication in response to reductions in the amplitude of the rectified signals applied thereto.

In operation, the testing apparatus is connected to the ignition system with the engine running at normal temperatures. The additional capacitance provided by the capacitors C2–C4 causes the peak voltage which can be provided by the ignition system to drop to about two-thirds of its normal value. While the indefinitely continued application of this additional capacitance could cause burning of the points P1 and P2 over an extended period, the time required for performing testing with apparatus according to this invention causes no appreciable damage. To perform the test itself, full throttle is applied to the engine for a brief period so that the spark plugs must fire against maximum compression in the cylinders and the meter M is observed during this period. If any misfiring occurs, the large amplitude, low frequency A.C. signals thereby generated are passed by the filter F and, after rectification by the diode D1, are applied to the meter M to produce an indication of the degree of misfiring. The potentiometer R3 allows the sensitivity of the meter to be adjusted to accurately reflect the performance of an ignition system. The capacitor C7 allows the meter to be easily read since that capacitor is quickly charged through the diode D1 during the brief period of full throttle operation but discharges only slowly through the resistor R4 and the meter M thereby permitting the meter to be read as the indication decays slowly. Since the additional capacitance provided by the capacitors C2–C4 diverts a portion of the available energy and thus reduces the voltage available to fire the spark plugs, misfiring will occur during the test as a result of conditions, e.g., partially burned spark plugs, which would not at the time cause misfiring during normal operation but which correspond to an incipient failure. This is of considerable advantage in checking automobile ignition systems prior to undertaking long trips, etc. where such incipient failures might develop to cause an actual breakdown or less than satisfactory operation in terms of gas mileage and perfoamrnce.

While failures due to spark plug burning have been described by way of example, it should be understood that other failures preventing the firing of a spark plug will also be detected, e.g., excessive resistance or breaks in the high-tension ignition cables and leakage paths to ground on the high-tension lines which divert a portion of the available energy. Further, each of these failures may be detected while still in an incipient stage prior to actual failure.

It should also be noted that testing with the apparatus of this invention may be quickly and easily performed without disturbing the normal wiring of the ignition system and without applying a dissipative, i.e., resistive load, which could damage ignition system components. Further, by choosing appropriate component values, apparatus of this invention can be used to test ignition systems of other types, e.g., those employing semiconductor switching means.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Apparatus for testing an internal combustion engine ignition system of the type having at least one spark plug, an inductive ignition coil and circuit means for charging said coil, said circuit means including timing switch means for controlling the flow of current through said coil thereby to discharge energy from said coil into said spark plug and a condenser of predetermined value connected across said switch means for suppressing arcing; said testing apparatus comprising:

a pair of test leads one of which is adapted to be connected to said ignition system between said coil and said switch means and the other of which is adapted to be connected to said ignition system on the other side of said switch means at a point of fixed potential, whereby said leads are connected across said switch means;

a low pass filter connected to said leads for selectively passing A.C. signals at frequencies which are characteristic of the discharge of said coil without firing of said spark plug and for blocking A.C. signals at frequencies which are characteristic of the discharge of said coil with firing of said spark plug;

a rectifier for rectifying A.C. signals passed by said filter;

a meter for indicating the amplitude of signals passed by said filter and rectified by said rectifier; and a capacitor connected across said test leads for reducing the peak voltage provided by said coil, the value of said capacitor being approximately six times the capacitance value of the ignition system condenser, whereby conditions corresponding to an incipient failure in said ignition system will cause said spark plug to misfire during testing and said meter will provide a reading indicating the misfire.

2. Apparatus as set forth in claim 1 wherein said capacitor comprises a plurality of capacitor units and wherein said apparatus includes manually operable switch means for selectively disconnecting at least one of said units thereby to reduce the effective capacity of said capacitor.

3. Apparatus as set forth in claim 2 wherein said manually operable switch means comprises a normally closed push-button switch.

4. Apparatus as set forth in claim 1 including a storage capacitor connected across said meter for delaying the decay of a meter indication caused by misfiring of said spark plug whereby momentary failures under load can be detected.

5. Apparatus as set forth in claim 1 wherein said low pass filter comprises a pair of resistors connected in series with one of said leads and a capacitor connecting a junction between said resistors to the other of said leads.

6. Apparatus as set forth in claim 1 including a potentiometer connected between said filter and said meter for selectively varying the sensitivity of said meter to signals passed by said filter.

7. Apparatus as set forth in claim 1 wherein said rectifier means includes a diode oriented to block D.C. voltages employed in charging said coil.

References Cited

UNITED STATES PATENTS

| | | | |
|---|---|---|---|
| 1,914,496 | 6/1933 | Fernandez | 324—16 |
| 2,430,069 | 11/1947 | Mesh | 324—16 |
| 2,926,301 | 2/1960 | Westberg | 324—16 |
| 3,032,707 | 5/1962 | St. John | 324—16 |

RUDOLPH V. ROLINEC, Primary Examiner

M. J. LYNCH, Assistant Examiner